US012643073B2

(12) United States Patent
    Vartia

(10) Patent No.: US 12,643,073 B2
(45) Date of Patent: Jun. 2, 2026

(54) EVALUATING THE INTEGRITY OF A FORWARD OSMOSIS MEMBRANE USING TRANSMEMBRANE PRESSURE

(71) Applicant: GAMBRO LUNDIA AB, Lund (SE)

(72) Inventor: Christian Vartia, Veberöd (SE)

(73) Assignee: GAMBRO LUNDIA AB, Lund (SE)

( * ) Notice: Subject to any disclaimer, the term of this patent is extended or adjusted under 35 U.S.C. 154(b) by 430 days.

(21) Appl. No.: 18/554,393

(22) PCT Filed: Apr. 5, 2022

(86) PCT No.: PCT/EP2022/058924
    § 371 (c)(1),
    (2) Date: Oct. 6, 2023

(87) PCT Pub. No.: WO2022/214448
    PCT Pub. Date: Oct. 13, 2022

(65) Prior Publication Data
    US 2024/0246037 A1      Jul. 25, 2024

Related U.S. Application Data

(60) Provisional application No. 63/172,853, filed on Apr. 9, 2021.

(30) Foreign Application Priority Data

Aug. 12, 2021    (SE) .................................... 2150993-0

(51) Int. Cl.
    *B01D 65/10*          (2006.01)
    *B01D 61/00*          (2006.01)
    *G01M 3/26*           (2006.01)
(52) U.S. Cl.
    CPC ....... *B01D 65/102* (2013.01); *B01D 61/0023* (2022.08); *G01M 3/26* (2013.01);
    (Continued)

(58) Field of Classification Search
    CPC .................. B01D 65/10; B01D 65/102; B01D 61/002–005
    See application file for complete search history.

(56) References Cited

U.S. PATENT DOCUMENTS

| | | | |
|---|---|---|---|
| 5,431,811 A | 7/1995 | Tusini et al. | |
| 6,066,261 A | 5/2000 | Spickermann | |

(Continued)

FOREIGN PATENT DOCUMENTS

| | | | |
|---|---|---|---|
| WO | 2012161744 A2 | 11/2012 | |

OTHER PUBLICATIONS

Kim et al., "Performance Evaluation and Fouling Propensity of Forward Osmosis (FO) Membrane for Reuse of Spent Dialysate", Membranes (2020), 10(12), pp. 1-16.

(Continued)

*Primary Examiner* — Erika J. Villaluna
(74) *Attorney, Agent, or Firm* — K&L Gates LLP

(57)          ABSTRACT

Provide herein are a control arrangement and method for evaluating the integrity of a forward osmosis (FO-) membrane of a FO device in a dialysis solution generation apparatus. The FO-membrane separates a feed side and a draw side of the FO device. The FO-device comprises a feed inlet port and a feed outlet port in fluid communication with the feed side, and a draw inlet port and a draw outlet port in fluid communication with the draw side. The method comprises providing a flow of feed solution at the feed side via the feed inlet port and providing a flow of draw solution at the draw side via the draw inlet port, with an osmotic pressure at the draw side that is higher than an osmotic pressure at the feed side. Water is extracted from the feed side to the draw side to dilute the draw solution.

15 Claims, 3 Drawing Sheets

(52) U.S. Cl.
CPC .... *B01D 2313/18* (2013.01); *B01D 2313/243*
(2013.01); *B01D 2313/60* (2022.08); *B01D*
*2313/903* (2022.08)

(56)  References Cited

U.S. PATENT DOCUMENTS

| | | | | |
|---|---|---|---|---|
| 10,384,167 | B2 * | 8/2019 | Helm | B01D 61/0023 |
| 10,464,021 | B2 * | 11/2019 | Benton | B01D 61/0021 |
| 2003/0100857 | A1 | 5/2003 | Pedrazzi et al. | |
| 2013/0028788 | A1 | 1/2013 | Gronau et al. | |
| 2019/0001043 | A1 | 1/2019 | Spickermann et al. | |

OTHER PUBLICATIONS

Swedish Search Report from corresponding Swedish Patent Appli-
cation No. 2150993-0 mailed Apr. 13, 2022.
International Search Report from International Patent Application
No. PCT/EP2022/058927, mailed Jul. 19, 2022.
Written Opinion from International Patent Application No. PCT/
EP2022/058927, mailed Jul. 19, 2022.

* cited by examiner

EVALUATING THE INTEGRITY OF A FORWARD OSMOSIS MEMBRANE USING TRANSMEMBRANE PRESSURE

PRIORITY CLAIM

This application is a national phase entry of PCT/EP2022/058924, filed Apr. 5, 2022, which claims priority to U.S. Provisional Application No. 63/172,853, filed Apr. 9, 2021, and to Swedish Patent Application No. 2150993-0, filed on Aug. 12, 2021, the entire disclosures of which are incorporated herein by reference.

TECHNICAL FIELD

The present disclosure relates to the field of dialysis and to integrity testing of forward osmosis membranes, and in particular to evaluating the integrity of a forward osmosis membrane arranged in a dialysis solution generation apparatus.

BACKGROUND

Dialysis is commonly used for treating patients suffering from renal failure. Several types of dialysis treatments exist such as hemodialysis (HD), peritoneal dialysis (PD) and continuous renal replacement therapy (CRRT). Typically, a dialysis fluid is used in the treatment and is delivered ready-made in bags or is produced at the point of use by mixing concentrate and water.

Forward osmosis (FO) has emerged as an option for producing dialysis fluid as it has potential for reducing water consumption. A FO-membrane is typically designed to be more or less exclusively selective towards water molecules, which enables the FO-membrane to separate water from all other contaminants. However, undetected integrity issues could allow transport of components other than water across the FO-membrane.

Thus, there is a need to detect such integrity issues to not compromise the produced dialysis fluid.

SUMMARY

A FO-membrane of the present disclosure is used to prepare dialysis fluid. The FO-membrane is in one embodiment more or less exclusively selective towards water molecules, which enables the FO-membrane to separate water from all other contaminants. An osmotic pressure difference between a feed solution (for example water or effluent from the dialysis treatment) and a draw solution (a dialysis concentrate) separated by the FO-membrane is used for extracting pure water from the feed solution to the dialysis concentrate, thereby diluting the dialysis concentrate. The diluted dialysis concentrate is thereafter used for producing dialysis fluid. The systems and methods of the present disclosure detect integrity issues with the FO-membrane, enabling the alteration of the composition of the produced dialysis fluid by the transport of components other than water across the FO-membrane to be prevented.

It is accordingly an objective of the disclosure to provide a simple and reliable method to evaluate the integrity of a forward osmosis membrane. It is a further objective to provide a method for evaluating the integrity of a forward osmosis membrane online or as dialysis fluid is being prepared.

These objectives and others are at least partly achieved by the method, control arrangement and dialysis solution generation apparatus according to the independent claims, and by the embodiments according to the dependent claims.

According to one aspect, which may be combined with any other aspect and embodiment thereof, the disclosure relates to a method for evaluating the integrity of a forward osmosis (FO)-membrane of a FO device in a dialysis solution generation apparatus. The FO-membrane separates a feed side from a draw side of the FO device. The FO-device comprises a feed inlet port and a feed outlet port in fluid communication with the feed side, and a draw inlet port and a draw outlet port in fluid communication with the draw side. The method comprises providing a flow of feed solution at the feed side via the feed inlet port, and providing a flow of draw solution at the draw side via the draw inlet port, at an osmotic pressure at the draw side that is higher than an osmotic pressure at the feed side, whereby water is extracted from the feed side to the draw side to dilute the draw solution. The method further comprises stopping flow via the draw inlet port, the feed inlet port and the feed outlet port, whereby water continues to be extracted from the feed side to the draw side, until a transmembrane pressure (TMP) between the draw side and the feed side has reached a maximum value. The method further comprises monitoring one or more pressures indicative of the TMP; and evaluating the integrity of the FO-membrane based on monitored one or more parameters including the one or more pressures indicative of the TMP.

The method provides a straight-forward and reliable way to evaluate the integrity of a FO-membrane. Based on one or more pressures indicative of the TMP, an integrity error may be detected. For a FO-membrane having integrity, it is expected that the maximum TMP will more or less remain constant and very slowly decrease. For a FO-membrane with an integrity error, a convective fluid transport from the draw side to the feed side, or a diffusive solute transport from the draw side to the feed side (with diffusive water transport from the draw side to the feed side), might occur depending on the source of error. In either case, the hydrostatic pressure at the feed side will increase and result in reduced maximum TMP and/or a relatively fast decrease in TMP after the maximum TMP has been reached. This behavior is used for evaluating the integrity of the FO-membrane. The method is easy to implement as it uses already present features in the dialysis solution generation apparatus and can be performed automatically, without human intervention.

According to some embodiments, evaluating the integrity comprises evaluating characteristics of the TMP or one or more pressures indicative of the TMP, including one or more of magnitude, time to reach maximum value, and/or relaxation. Thereby, information about the integrity of the FO-membrane can be obtained.

According to some embodiments, evaluating the integrity comprises evaluating relaxation of the TMP based on the monitored one or more pressures indicative of the TMP. Evaluating relaxation allows small integrity errors to be detected.

According to some embodiments, the method comprising evaluating the integrity of the FO-membrane based on a magnitude of a relaxation rate of the TMP determined based on the monitored one or more pressures indicative of the TMP. The magnitude evaluation also allows small integrity errors to be detected.

According to some embodiments, the method comprises evaluating the integrity based on fulfilment of one or more integrity criteria for the magnitude of the relaxation rate of the TMP. The integrity criteria evaluation allows a severity of an integrity error to be determined.

According to some embodiments, evaluating the integrity of the FO-membrane comprises evaluating the integrity based on monitored one or more parameters including the one or more pressures indicative of the TMP during a time period after the stopping has been performed. Here, the one or more pressures should reflect any integrity errors during such time period.

According to some embodiments, the maximum value of the TMP is characterized by a relaxation rate of the TMP at a zero magnitude. Here, the maximum value of the TMP may be defined as the TMP at its maximum point after the flows have been stopped.

According to some embodiments, the method comprises determining the maximum value of the TMP, based on the monitored one or more pressures indicative of the TMP; controlling flow of solution via the feed inlet port or feed outlet port based on the monitored one or more pressures indicative of the TMP and the determined maximum value of TMP, such that the TMP corresponds to the determined maximum value of TMP; and monitoring one or more parameters indicative of a flow rate of the resulting provided flow of solution. Here, an alternative way of evaluating the integrity is achieved.

According to some embodiments, the controlling comprises controlling the speed of a feed pump, the monitoring comprises monitoring the speed of the feed pump, and evaluating the integrity comprises evaluating the integrity of the FO-membrane based on the monitored speed of the feed pump. Hence, an easily achieved method is provided, as the speed of the feed pump is readily available in the control arrangement.

According to some embodiments, the method comprises evaluating the integrity based on fulfilment of one or more integrity criteria for the one or more parameters indicative of a flow rate of the resulting provided flow of feed solution. The integrity criteria enable a severity of an integrity error to be determined.

According to some embodiments, the draw outlet port is connected to a diluted concentrate container. The draw side is therefore connected to a pressure at or close to atmospheric pressure, which typically remains rather constant during performance of the method.

According to some embodiments, the monitoring comprises monitoring one or more pressures including a pressure indicative of the pressure at the feed side, and/or comprises monitoring one or more pressures including a pressure indicative of the pressure at the draw side. The TMP may therefore be derived in a plurality of ways.

According to some embodiments, the method comprises increasing the hydrostatic pressure at the feed side, such that it is greater than the hydrostatic pressure at the draw side. Thereafter the method comprises monitoring one or more pressures indicative of the TMP; and evaluating the integrity of the FO-membrane based on monitored one or more parameters including the one or more pressures indicative of the TMP. Hence, by establishing a bulk pressure at the feed side a leak that is only present from the feed side to the draw side may be distinguished.

According to a second aspect, which may be combined with any other aspect and embodiment thereof, the disclosure relates to a control arrangement for evaluating the integrity of a forward osmosis (FO)-membrane of a FO-device in a dialysis solution generation apparatus. The FO-membrane separates a feed side and a draw side of the FO-device. The FO-device comprises a feed inlet port and a feed outlet port in fluid communication with the feed side, and a draw inlet port and a draw outlet port in fluid communication with the draw side. The control arrangement comprises a feed pump configured to provide a flow of feed solution at the feed side via the feed inlet port, and a draw pump configured to provide a flow of draw solution at the draw side via the draw inlet port, at an osmotic pressure at the draw side that is higher than an osmotic pressure at the feed side, thereby allowing extraction of water from the feed side to the draw side to dilute the draw solution. The control arrangement also comprises one or more pressure sensors configured to measure one or more pressures indicative of a TMP between the draw side and the feed side, and a valve arrangement configured to control one or more flows via the draw inlet port, feed inlet port or feed outlet port. The control arrangement is further configured to stop the flow via the draw inlet port, the feed inlet port and the feed outlet port, using the feed pump, the draw pump, and the valve arrangement, thereby allowing water to continue to be extracted from the feed side to the draw side, until a transmembrane pressure (TMP) between the draw side and the feed side has reached a maximum value. The control arrangement is further configured to monitor one or more pressures indicative of the TMP, using the one or more pressure sensors, and to evaluate the integrity of the FO-membrane based on monitored one or more parameters, including the one or more pressures indicative of the TMP.

According to some embodiments, the control arrangement according to the second aspect is configured to perform any one of the embodiments according to the first aspect.

According to a third aspect, which may be combined with any other aspect and embodiment thereof, the disclosure relates to a solution generation apparatus for generating dialysis solution. The apparatus comprises a forward osmosis device comprising a FO-membrane that separates a feed side and a draw side of the FO device. The apparatus further comprises a control arrangement according to the second aspect.

According to a fourth aspect, the disclosure relates to a computer program comprising instructions to cause the control arrangement according to the second aspect to execute the method according to the first aspect.

According to a fifth aspect, the disclosure relates to a computer-readable medium having stored thereon the computer program of the fourth aspect.

DETAILED DESCRIPTION

Figure 1:
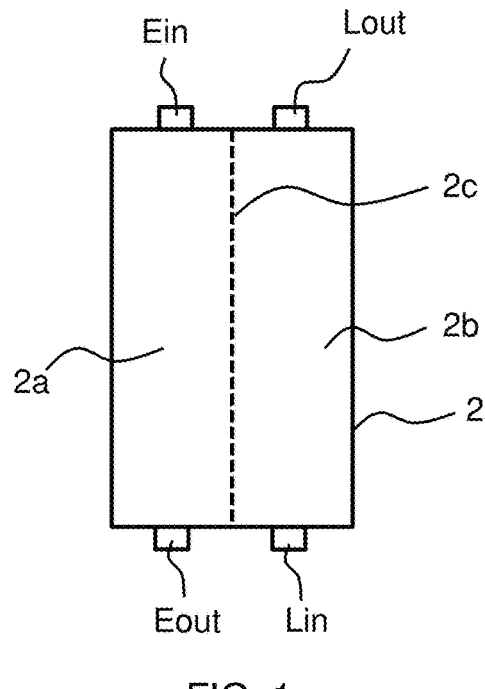
FIG. 1 is a schematic illustration of a FO-device, according to some embodiments of the disclosure.

In the following description, methods for evaluating the integrity of a forward osmosis (FO)-membrane will be described. The FO-membrane is used in a FO-device in a dialysis fluid generation apparatus for generating a dialysis solution that is thereafter used for producing a dialysis fluid. The dialysis fluid may be used for PD, HD, CRRT or any other dialysis treatment using dialysis fluid as a treatment fluid or replacement fluid (e.g., for diluting blood post-filtering).

In detail, the FO-membrane is used for extracting water from patient effluent, tap water or other water feed source into a dialysis concentrate to generate the dialysis solution. Membrane integrity may be defined as the quality or state of the complete membrane in perfect condition. Hence, a FO-membrane that has integrity is intact; it is not damaged or impaired in any way. The FO-membrane may experience a compromised integrity due to for example manufacturing errors or wear. The compromised integrity may cause integrity issues such as leakage (convective transport), or selectivity deterioration which will cause an elevated rate of diffusive solute transport (solute flux) through the FO-membrane. Undetected integrity issues could alter the composition of produced dialysis fluid by allowing transport of components other than water across the FO-membrane. For example, a leakage may allow transport of microbials from the feed side (effluent or tap water) to the draw side (mixing side) and increase the risk for, e.g., peritonitis in case of PD. Further, a leakage may allow transport of solutes (electrolytes, glucose, urea etc.) from the feed side (effluent or tap water) to the draw side (mixing side) and thereby alter the composition of the produced dialysis fluid. Also, an elevated rate of diffusive electrolyte transport may be indicative of a risk that solutes (electrolytes, glucose, urea etc.) will diffuse across the FO-membrane in one or both directions at a rate that severely alters the composition of the produced dialysis fluid. Effluent may here include patient effluent in PD and/or spent dialysate in HD or CRRT.

It has been found, as set forth in the present disclosure, that it is possible to detect such integrity issues after the FO-membrane is installed in the dialysis fluid generation apparatus, by stopping flows to and from the FO-device and monitoring the resulting TMP or one or more pressures indicative of the resulting TMP. For example, characteristics such as magnitude, time to reach maximum value, and/or relaxation may be investigated.

Depending on the magnitude of the relaxation rate, an evaluation of the integrity can be made. In other embodiments, the TMP is controlled to a maximum TMP determined after the flows were stopped, whereby an evaluation of the integrity can be made based on the resulting flow rate from, speed of, or power to a pump controlled to maintain the TMP at the maximum TMP.

Generally, diffusive transport of water and solutes is driven by the solute concentration difference, e.g., a concentration difference between feed side and draw side. Convective flow (caused by a leak) is driven by a trans-membrane pressure (TMP) difference, e.g., a pressure difference between feed side and draw side.

In some embodiments, the evaluation relies on existing technology and concentrates used for the production of dialysis fluid. For example, a pressure sensor is already present for sensing pressure at the feed side. The solutions used are solutions that are already used for producing dialysis solution, for example, tap water, effluent from the dialysis treatment, or a dialysis concentrate.

Embodiments of the disclosure will now be described with reference to FIGS. 1 to 4. FIG. 1 is a schematic illustration of a FO-device 2 in isolation according to some embodiments. The FO-device 2 comprises a first side 2a and a second side 2b that are separated by a FO-membrane 2c. For ease of illustration and explanation, a first side 2a at the left-hand side will be referred to as a feed side, and a second 2b at the right-hand side will be referred to as a draw side. However, the first side 2a may alternatively be referred to as a draw side, and the second side 2b may be referred to as a feed side, depending on the direction of the osmotic pressure difference of the fluids flowing at the sides 2a, 2b. A side may also be referred to herein as a compartment or chamber. During use, the FO-membrane 2c separates a solution at the feed side (referred to as a feed solution) and a solution at the draw side (referred to as a draw solution). Due to the osmotic pressure difference between the fluids, the draw solution at the draw side "draws" pure water from the feed solution at the feed side. Hence, water is extracted from the feed solution at the feed side 2a to the draw solution at the draw side 2b. As a result, in the FO-process, the feed solution becomes dewatered, and the draw solution becomes diluted in the FO-device 2. The FO-membrane 2c is designed to be more or less exclusively selective towards permeating water molecules, which enables the FO-membrane 2c to separate water from all other contaminants. Hence, the FO-membrane 2c is a water permeable membrane. The FO-membrane 2c typically has a pore-size in the nanometer (nm) range, for example, from 0.5 to 5 nm or less, depending on the solutes that are intended to be blocked. The FO-device 2 typically includes a cartridge that encloses the feed side 2a, draw side 2b and FO-membrane 2c. The geometry of the FO-membrane 2c may be a flat-sheet, or a tubular or hollow fiber. The feed side 2a has an inlet port $E_{in}$ where a feed solution passes into the feed side 2a, and an outlet port $E_{out}$ wherefrom the feed solution passes out from the feed side 2a. The draw side 2b has an inlet port $L_{in}$ where a draw solution passes into the draw side 2b, and an outlet port $L_{out}$ wherefrom the draw solution passes out from the draw side 2b. Hence, the fluids at these sides typically flow in counter-current flow but may alternatively flow in co-current flows. The flows are continuous flows. Suitable FO-devices for FO-device 2 may be provided by, e.g., Aquaporin™, Asa-hiKASEI™, Berghof™, CSM™, FTSH$_2$O™, Koch Membrane Systems™, Porifera™, Toyobo™ and Toray™.

The feed solution is for example effluent from a current or previous dialysis treatment or water. In some embodiments, the effluent has an osmotic pressure of about 8 bar (116 psig). The water typically has an osmotic pressure well below 1 bar (14.5 psig). The draw solution is for example a dialysis concentrate, wherein extracted water dilutes the dialysis concentrate into a dialysis solution, which may also be referred to as a "diluted dialysis concentrate", an "intermediate dialysis solution"," or simply "dialysis solution". The dialysis concentrate is for example a concentrate including at least one of, e.g., a plurality of, NaCl, KCl, CaCl2, MgCl2, HAc, glucose, lactate and bicarbonate. For example, the dialysis concentrate may comprise NaCl, CaCl2, MgCl2 and Na-lactate. Such dialysis concentrate may have an osmotic pressure of about 130 bar (1885 psig). A 50 percent glucose concentrate may have a pressure around 70 bar (1015 psig). Another dialysis concentrate for HD may have an osmotic pressure of 260 bar (3770 psig). Hence, the osmotic pressure of the dialysate concentrate is typically higher than 50 bar (725 psig), and for example between 70 to 260 bar (1015 to 3770 psig), and in one embodiment between 130 to 260 bar (1885 to 3770 psig).

Figure 2:
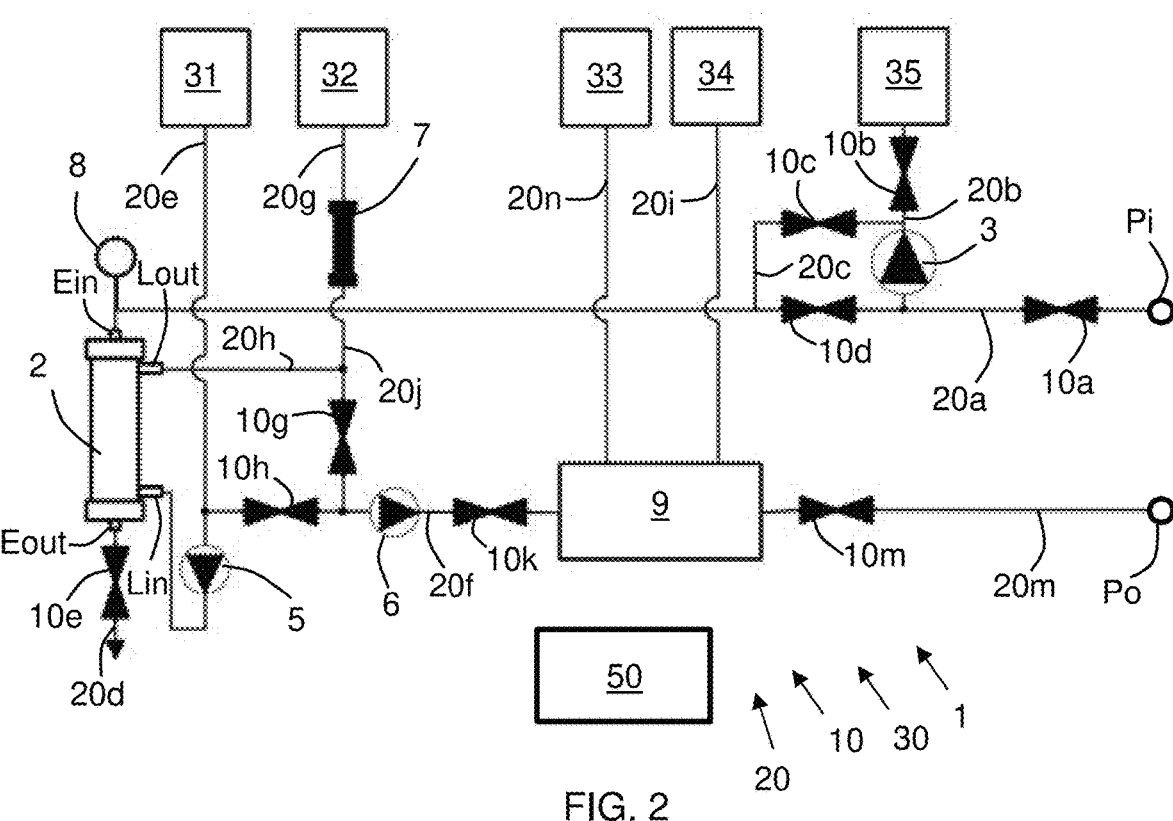
FIG. 2 illustrates an example dialysis solution generation apparatus according to some embodiments of the disclosure.

FIG. 2 illustrates a dialysis fluid generation apparatus 1 (hereinafter "apparatus 1") according to some embodiments of the disclosure. The apparatus 1 comprises a FO-device 2 as explained with reference to FIG. 1. The apparatus 1 also comprises a flow path 20 comprising a plurality of fluid lines 20a-20n, hereinafter referred to as "lines". The apparatus 1 further comprises a control arrangement 30. The control arrangement 30 comprises a feed pump 3, a draw pump 5 and a diluted dialysis concentrate pump 6. Any of the pumps herein may for example be a volumetric pump (such as a piston pump) or a non-volumetric pump (for example a gear pump) with flow rate feedback from a flow sensor (not shown). The feed pump 3 is configured to pump effluent from a patient connected to an inlet connector $P_i$ to an effluent container 35. The feed pump 3 is configured, depending on a valve state, to provide a flow of effluent from the effluent container 35 or inlet connector $P_i$ to the first side 2a and from the first side 2a to a drain (not shown). The draw pump 5 is configured, depending on a valve state, to provide a flow of a dialysis concentrate from a dialysis concentrate container 31 to the second side 2b, and further pump the generated solution at the second side 2b to a diluted concentrate container 32. A pure water container 33 contains pure water. A fluid container 34 comprises an osmotic agent or a buffer solution, for example, glucose or bicarbonate. The apparatus 1 also comprises a conductivity sensor 7 configured to sense a conductivity of a solution generated from the second side 2b. The conductivity sensor 7 is arranged to sense conductivity in the range of 0.1 to 40 mS/cm. The conductivity sensor may also include a temperature sensor (not shown) to compensate sensed conductivity values. The apparatus 1 further comprises one or more pressure sensors configured to sense pressures indicative of a transmembrane pressure (TMP) of the FO-device 2. For example, the apparatus 1 comprises a pressure sensor 8 arranged to sense a pressure at the feed side 2a. The apparatus 1 may comprise additional pressure sensors, for example, a pressure sensor arranged to sense a pressure at the draw side 2b. The diluted dialysis concentrate pump 6 is configured to provide a flow of fluid in a main line 20f. The control arrangement 30 also comprises a valve arrangement 10 comprising a plurality of valves 10a-10m. Generally, a valve connected to a line may be configured as open, wherein a fluid flow in the line is allowed, and closed, wherein a fluid flow in the line is stopped. A valve may for example be an on/off valve, wherein the on state is a state when fluid flow in the line is allowed, and the off state is a state wherein the fluid flow in the line is stopped. The control arrangement 30 further comprises a control unit 50 comprising at least one memory and at least one processor. The control arrangement 30, by means of the control unit 50, is configured to control the pumps and valves of the valve arrangement 10, and the functionality of a mixing unit 9, to perform a plurality of different processes, such as to dilute a dialysis concentrate into dialysis solution, provide dialysis fluid, perform a cleaning process or a priming process. The control arrangement 30 is also configured to receive measurements of conductivity from the conductivity sensor 7. The control arrangement 30 is further configured to receive measurements of pressure from the one or more pressure sensors, including the pressure sensor 8. Specifically, the control arrangement 30 is configured to evaluate integrity of the FO-membrane 2c in the apparatus 1, defined by a method illustrated in FIG. 3. For that purpose, the at least one memory comprises instructions for evaluating the integrity of the FO-membrane 2c. When the instructions are executed by the at least one processor, the control arrangement 30 performs the method for evaluating the integrity of the FO-membrane 2c that will be explained in the following. The method may be performed by the control arrangement 30 and stored as a computer program including computer instructions on the at least one memory.

However, first the apparatus 1 in FIG. 2 will be described in more detail. In FIG. 2, a first effluent inlet line 20a is arranged between the inlet connector $P_i$ and a feed inlet port $E_{in}$ of the first side 2a, to connect the inlet connector $P_i$ and the feed inlet port $E_{in}$. The inlet connector $P_i$ is for example connectable to an effluent line or catheter of a PD patient, or to a spent dialysate line of a HD or CRRT apparatus. A first effluent inlet valve 10a is connected to the first effluent inlet line 20a. A second effluent inlet line 20b is arranged between the first effluent inlet line 20a and an effluent container 35, to connect the first effluent inlet line 20a and the effluent container 35. The feed pump 3 is arranged to provide a flow of effluent in the second effluent inlet line 20b. A second effluent inlet valve 10b is connected to the second effluent inlet line 20b. A third effluent inlet line 20c is arranged between the first effluent inlet line 20a and the second effluent inlet line 20b, to connect the first effluent inlet line 20a and the second effluent inlet line 20b. A third effluent inlet valve 10c is connected to the third effluent inlet line 20c. A fourth effluent inlet valve 10d is connected to the first effluent inlet line 20a between the connection of the second effluent inlet line 20b and the third effluent inlet line 20c to the first effluent inlet line 20a. The effluent may be collected in the effluent container 35 by pumping effluent to the container 35 with the feed pump 3, opening first effluent inlet valve 10a and second effluent inlet valve 10b, and closing third effluent inlet valve 10c and fourth effluent inlet valve 10d. Effluent can thereafter be pumped with feed pump 3 from effluent container 35 to feed side 2a by opening second effluent inlet valve 10b and fourth effluent inlet valve 10d, and closing first effluent inlet valve 10a and third effluent inlet valve 10c. Alternatively, effluent may be pumped directly to first side 2a by pumping effluent with feed pump 3 from inlet connector $P_i$, through first effluent inlet line 20a, second effluent inlet line 20b and third effluent inlet line 20c, opening first effluent inlet valve 10a and third effluent inlet valve 10c, and closing second effluent inlet valve 10b and fourth effluent inlet valve 10d.

An effluent outlet line 20d is arranged between the feed outlet port $E_{out}$ of the first side 2a and a drain (not shown) and connects the feed outlet port $E_{out}$ of the first side 2a to drain. An effluent outlet valve 10e is connected to the effluent outlet line 20d. Hence, the FO-device 2 comprises a feed inlet port $E_{in}$ and a feed outlet port $E_{out}$ in fluid communication with the feed side 2a.

Further, a dialysis concentrate line 20e is arranged between the dialysis concentrate container 31 and the draw inlet port $L_{in}$ of the draw side 2b to connect the dialysis concentrate container 31 and the draw inlet port $L_{in}$ of the draw side 2b. The draw pump 5 is arranged to provide a flow in the dialysis concentrate line 20e. A main line 20f is arranged between the dialysis concentrate line 20e and a mixing unit 9 and connects the dialysis concentrate line 20e and the mixing unit 9. The mixing unit 9 includes fluid mixing functionality, such as a main pump controlling a resulting flow rate in line 20m downstream mixing unit 9, a fluid pump providing a flow of, e.g., glucose solution from the fluid container 34, a conductivity sensor, a heater and a mixing chamber (these features not explicitly shown). The main line 20f is connected to the dialysis concentrate line 20e between the dialysis concentrate container 31 and the draw pump 5. A diluted concentrate container line 20g is arranged between a diluted concentrate container 32 and the main line 20f, to connect the diluted concentrate container 32 and the main line 20f. The conductivity sensor 7 is connected to the diluted concentrate container line 20g to sense a conductivity of the diluted dialysis concentrate fluid in the diluted concentrate container line 20g. A diluted concentrate container valve 10g is connected to the diluted concentrate container line 20g. A first connecting line 20h is arranged between the draw outlet port $L_{out}$ of the draw side 2b and the diluted concentrate container line 20g, to connect the draw outlet port $L_{out}$ of the draw side 2b and the diluted concentrate container line 20g. Hence, the FO-device 2 comprises a draw inlet port $L_{in}$ and a draw outlet port $L_{out}$ in fluid communication with the draw side 2b. A first main valve 10h is connected to the main line 20f, between a connecting point of the main line 20f and the dialysis concentrate line 20e, and a connecting point of the diluted concentrate container line 20g and the main line 20f. Dialysis concentrate may be pumped from the dialysis concentrate container 31 to the diluted concentrate container 32 via the draw side 2b, by pumping with draw pump 5 and closing diluted concentrate container valve 10g and first main valve 10h. Simultaneously, effluent may be pumped at the feed side 2a. Pure water is then extracted from the effluent at the feed side 2a to the dialysis concentrate at the draw side 2b via osmotic pressure. Thus, the dialysis concentrate will become diluted to form an intermediate dialysis solution and is collected in diluted concentrate container 32. This procedure may be referred to as a FO-session. Hence, the FO-device 2 is configured to be used in a FO-session for diluting a dialysis concentrate in a process of producing a dialysis solution.

A fluid line 20i is arranged between the fluid container 34 and the mixing unit 9 to connect the fluid container 34 and the mixing unit 9. A second main valve 10k is connected to the main line 20f, between the diluted dialysis concentrate pump 6 and the mixing unit 9. A water line 20n is arranged between the pure water container 33 (containing pure water) and the mixing unit 9, to connect the pure water container 33 and the mixing unit 9. An outlet line 20m is arranged between the mixing unit 9 and an outlet connector $P_o$ to connect the mixing unit 9 and the outlet connector $P_o$. The outlet connector $P_o$ may for example be connected to a catheter of a PD patient, or to a dialysis fluid line of a HD or CRRT apparatus. An outlet valve 10m is arranged so as to operate with the outlet line 20m.

For mixing a dialysis fluid, the diluted dialysis concentrate in diluted concentrate container 32 is pumped to mixing unit 9 by pumping with diluted dialysis concentrate pump 6, opening diluted concentrate container valve 10g, second main valve 10k and outlet valve 10m. At the same time, osmotic agent or buffer solution, such as glucose, is passed to the mixing unit 9 and by pumping with the fluid solution pump (not shown). Pure water flows to the mixing unit 9 via water line 20n. The main pump (not shown) provides a desired flow rate of resulting dialysis fluid in the line 20m downstream mixing unit 9. A conductivity sensor (not shown) of the mixing unit 9 measures the conductivity of the resulting dialysis fluid from the mixing unit 9. The diluted dialysis concentrate pump 6 and the fluid pump are controlled to attain certain speeds to achieve a desired predetermined concentration of the resulting dialysis fluid, based on the conductivity of the produced fluid, the conductivity of the diluted dialysis concentrate and flow rate of the produced fluid. In the mixing unit 9, the diluted dialysis concentrate, the osmotic agent/buffer solution and the pure water are mixed in a mixing chamber (not shown) to form a dialysis fluid, and are optionally heated. Thereafter, the dialysis fluid is delivered at the outlet connector $P_o$ via outlet line 20m to a desired destination (e.g., a storage container or a dialysis machine).

The pure water typically has a quality as water for injection (WFI) or water for dialysis (WFD). WFI has a Total Organic Carbon (TOC) of maximum 500 ppg, a conductivity at 25° C. of less than 1.3 μS/cm, and bacterial endotoxins at less than 0.25 EU/ml. WFD has a Colony Forming Unit (CFU) of less than 100 CFU/ml and an Endotoxin Unit of less than 0.25 EU/mL. See e.g. ISO 26722:2009, ISO 22519:2019.

Figure 3:
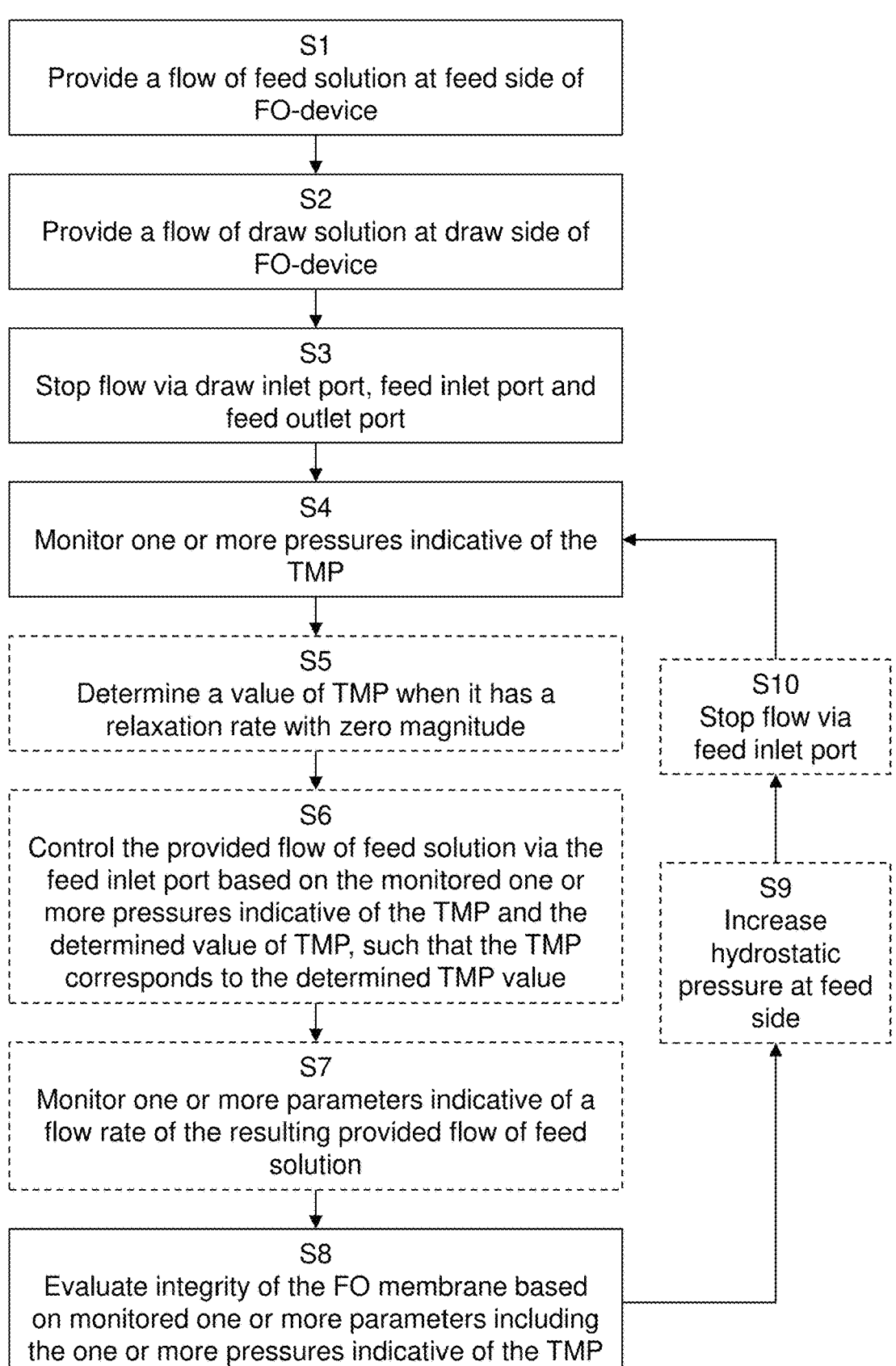
FIG. 3 illustrates a method for evaluating the integrity of a FO-membrane of a FO-device according to some embodiments of the disclosure.

A method for evaluating the integrity of a FO-membrane will now be explained with reference to the flow chart in FIG. 3. The method is for example implemented by the control unit 50 in FIG. 2. The FO-membrane is for example the FO-membrane 2c of the FO-device 2 in the apparatus 1 in FIG. 2. However, the method may be used in other apparatuses comprising a FO-membrane for evaluating the integrity thereof. The method may be performed before a treatment starts or after a treatment has stopped. The method may also start while the treatment is ongoing. The production of dialysis fluid will then be interrupted while the method is performed. The method in one embodiment comprises providing S1 a flow of feed solution at the feed side 2a via the feed inlet port $E_{in}$. In other words, the method comprises passing feed solution at the feed side 2a. Hence, the feed solution is provided at the feed inlet port $E_{in}$, so as to flow from the feed inlet port $E_{in}$, through the first side 2a for osmotic exchange through the FO-membrane 2c, to the outlet port $E_{out}$, where the solution leaves the FO-device 2. The feed solution is for example effluent or water. In the case where the feed solution is effluent, passing S1 includes pumping effluent from the effluent container 35, patient or other source fluidly connected to inlet connector $P_i$, and further to the inlet port $E_{in}$ of the first side 2a, using the feed pump 3 and opening/closing appropriate valves. In the case where the feed solution is water, the method may include connecting a water source to the first effluent inlet line 20a, for example, to inlet connector $P_i$, and pumping the water with feed pump 3 to the feed side 2a. Providing S1 further includes pumping the feed solution out from the outlet port $E_{out}$ of the first side 2a to a drain (not shown). The operating point of the apparatus 1 is typically well defined while providing S1 a flow of feed solution. For example, the operating point includes providing S1 a flow of feed solution with a constant relatively high flow rate of feed solution provided to the feed side 2a. For PD, the flow rate provided with the feed pump 3 is for example between 50 to 200 ml/min. For HD, the flow rate provided with the feed pump 3 is for example between 200 to 600 ml/min. The flow rate is controlled directly with the feed pump 3 or measured with a flow sensor (not shown) and is used as feedback for flow rate control with the feed pump 3. The operating point may also include providing S1 a hydrostatic pressure at the feed side 2a. The hydrostatic pressure may simply be a result of providing a certain flow rate as detailed above. Alternatively, the providing S1 includes controlling the hydrostatic pressure at the feed side 2a to a certain pressure, for example, a pressure close to or at atmospheric pressure. The pressure is for example controlled using the feed pump 3 and/or the valve 10e. The pressure at the feed side may be measured with the pressure sensor 8 and used as feedback for pressure control with the feed pump 3 and/or effluent outlet valve 10e.

The method further comprises providing S2 a flow of a draw solution at the draw side 2b via the draw inlet port $L_{in}$. Providing S2 of a flow of draw solution at the draw side 2b may be performed while providing S1 a flow of feed solution at the feed side 2a. In other words, the method comprises passing a draw solution at the second side 2b. Hence, the draw solution provided at the draw inlet port $L_{in}$, flows from the draw inlet port $L_{in}$, through the second side 2b for osmotic exchange through the FO-membrane 2c, to the draw outlet port $L_{out}$, where the solution leaves the FO-device 2. The draw solution is for example a dialysis concentrate such as a dialysis concentrate. In the case of a dialysis concentrate, providing S2 comprises pumping dialysis concentrate from the dialysis concentrate container 31 to the draw inlet port $L_{in}$ of the second side 2b, here using the draw pump 5, and closing first main valve 10h and diluted concentrate container valve 10g. The draw solution has a higher osmotic pressure than the feed solution. Hence, providing S2 a flow of draw solution comprises providing the flow of draw solution with an osmotic pressure at the draw side 2b that is higher than an osmotic pressure at the feed side 2a. Water is thereby extracted from the feed side 2a to the draw side 2b to dilute the draw solution. Hence, the method comprises diluting the draw solution and dewatering the feed solution. The osmotic pressure of a solution is proportional to the molar concentration of the solute particles in the solution. The solute particles in question may be electrolytes. An electrolyte is a substance that conducts electricity when dissolved in water. In some embodiments, the draw solution has an osmotic pressure between 70 and 260 bar (1015 and 3770 psig). Hence, the feed solution shall have an osmotic pressure that is lower than 70 bar (1015 psig), for example, lower than 10 bar (145 psig) to provide an osmotic pressure difference between the feed side 2a and the draw side 2b. Effluent may have an osmotic pressure of about 8 bar (116 psig). Water has a very low osmotic pressure, typically much lower than 1 bar (14.5 psig). Hence, in some embodiments, the osmotic pressure at the draw side 2b is at least 60 bar (870 psig) higher than the osmotic pressure at the feed side 2a. The hydrostatic pressure at the draw side 2b may be close to atmospheric pressure. Hence, the hydrostatic pressure at the feed side 2a and the draw side 2b may have equal, or close to equal, magnitudes. The operating point of the apparatus 1 is typically well defined while providing S2 a flow of draw solution. For example, the operating point includes providing S2 a flow of draw solution with a constant flow rate of draw solution provided to the draw side 2b. The flow rate provided with the draw pump 5 is typically decreased via a dilution factor of the draw solution, for example, 1:20. Hence, the flow rate provided with the draw pump 5 may then be 20 times lower than the flow rate provided with the feed pump 3. The flow rate is controlled directly with the draw pump 5 or measured with a flow sensor (not shown) and used as feedback for flow rate control with the draw pump 5.

Figure 4:
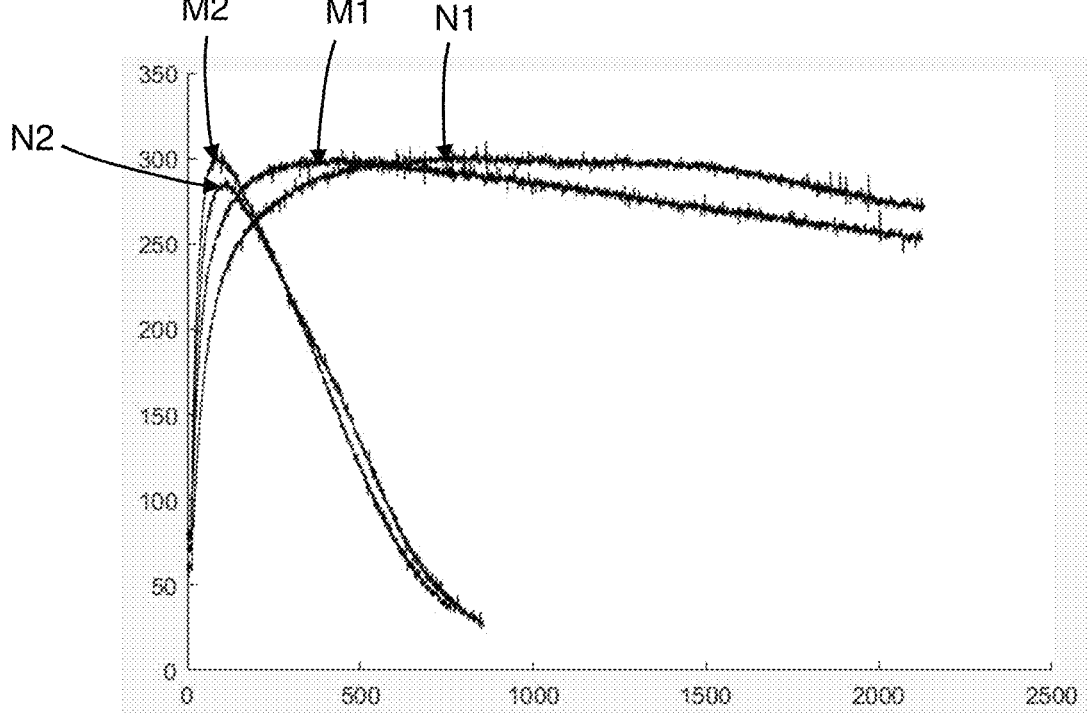
FIG. 4 is a diagram illustrating test results obtained from performing the method illustrated in FIG. 3.

When flows are provided at both sides 2a, 2b, the method comprises stopping S3 flow via the draw inlet port $L_{in}$, flow via the feed inlet port $E_{in}$ and flow via the feed outlet port $E_{out}$. In the apparatus 1 illustrated in FIG. 2, this step includes stopping the draw pump 5 to stop the flow via the draw inlet port $L_{in}$, stopping the feed pump 3, closing fourth effluent inlet valve 10d and third effluent inlet valve 10c (or second effluent inlet valve 10b) for stopping flow via the feed inlet port $E_{in}$, and closing effluent outlet valve 10e to stop flow via the feed outlet port $E_{out}$. The draw outlet port $L_{out}$ is still fluidly connected to the diluted concentrate container 32. Hence, fluid via the draw outlet port $L_{out}$ is allowed. When the flows are stopped in step S3, it is assumed that the hydrostatic pressure in the diluted concentrate container 32 is close to atmospheric pressure, for example, 1013 hPa (about 1 bar, 14.5 psig)). As the draw side 2b and the diluted concentrate container 32 are fluidly connected, they are also at about the same pressure, except for a hydrostatic difference. However, in some embodiments, the method comprises measuring the pressure at the draw side 2b, to obtain the pressure at the draw side 2b. After the flows are stopped, water continues to be extracted from the feed side 2a to the draw side 2b, until a transmembrane pressure (TMP) between the draw side 2b and the feed side 2a reaches a maximum value. At this point, an osmotic pressure difference between the feed side 2a and the draw side 2b and the TMP reside in a balanced state. Hence, when the flows are stopped, there is no longer an inflow of new feed solution to the feed side 2a, and there is no longer an inflow of new draw solution to the draw side 2b. The osmotic process continues however. In this process, pure water travels through the FO-membrane 2c from the feed side 2a to the draw side 2b, which decreases the hydrostatic pressure at the feed side 2a compared to the pressure when stopping the flow in step S3. The hydrostatic pressure at the draw side 2b remains more or less constant as it is connected to the diluted concentrate container 32. This because the water volume that might travel from the feed side 2a to the draw side 2b is minor compared to the volume of the diluted concentrate container 32. Hence, the TMP increases compared to the TMP when stopping the flows in step S3. There might be a convective flow from the draw side 2b to the feed side if a membrane leak exists, but this flow is expected to be minor compared to the main osmotic process with water molecules. The osmotic process continues until the TMP balances the osmotic pressure difference. Hence, the TMP is then equal to the positive osmotic pressure difference (when TMP is defined as Pdraw minus Pfeed). At this point, the TMP has reached a maximum value from when the flows were stopped in step S3, hence, the TMP has peaked. Here, the TMP changes from a negative TMP or a zero TMP (when the flows were stopped) to a positive TMP. The TMP peak is thus a positive TMP peak. Examples of TMP curves with TMP peaks are illustrated in FIG. 4, which are explained more below. At the maximum value of the TMP, a rate of the TMP is zero. Thus, the maximum value of the TMP is also characterized by a relaxation rate of the TMP having a zero magnitude. With an ideal FO-membrane 2 having integrity, the TMP will now continue to be fairly constant. However, most, if not all, FO-membranes have a very minor integrity error that is acceptable, which will cause some solutes to diffuse from the draw side 2b to the feed side 2a and very slowly decrease the TMP. The TMP therefore starts to relax. The fluids in the FO-unit 2 will strive to maintain a balanced state between the osmotic pressure difference and the TMP. With a FO-membrane having an integrity error, it is expected that the TMP will decrease rather rapidly after the TMP has peaked. The rapid decrease is because larger integrity errors cause a larger diffusion of solutes or leakage flow from the draw side 2b to the feed side 2a. The development of the TMP during a time period after the TMP has peaked can thus be used as a basis for evaluating the integrity of the FO-membrane 2. To understand how the TMP develops, it has to be monitored. Hence, the method comprises monitoring S4 one or more pressures indicative of the TMP. For example, monitoring S4 comprises monitoring the pressure at the feed side 2a, using a pressure sensor 8. Monitoring S4 comprises repeatedly measuring the pressure at the feed side 2a. Monitoring S4 may include determining TMP from the pressure measured at the feed side 2a, assuming that the pressure at the draw side 2b is constant and close to atmospheric pressure, e.g., less than 1 bar (14.5 psig). The TMP is well represented by the pressure measured at the feed side 2a, e.g., the pressure measured with the pressure sensor 8. However, as the hydrostatic pressure at the feed side 2a decreases until the TMP peak has been reached, the TMP peak and hence the maximum value of the TMP corresponds to when the hydrostatic pressure at the feed side 2a has reached a minimum value. Alternatively, the method comprises also measuring the hydrostatic pressure at the draw side 2b. Monitoring S4 then comprises repeatedly measuring the pressure at the draw side 2b. The method may include determining the TMP as the hydrostatic pressure Pdraw at the draw side 2b, minus the hydrostatic pressure Pfeed at the feed side 2a. In other words, monitoring S4 comprises monitoring one or more pressures including a pressure indicative of the pressure at the feed side 2a, and/or monitoring S4 comprises monitoring one or more pressures including a pressure indicative of the pressure at the draw side 2b.

The TMP provides a basis for evaluating the integrity of the FO-membrane 2. In a first embodiment, the method comprises evaluating the integrity S8 of the FO-membrane based on the one or more pressures indicative of the TMP. Hence, the monitored one or more parameters includes the one or more pressures indicative of the TMP. Characteristics of the TMP provide a basis for an evaluation of the integrity of the FO-membrane 2c. Hence, in some embodiments, evaluating the integrity S8 comprises evaluating characteristics of the TMP or one or more pressures indicative of the TMP, including one or more of magnitude, time to reach maximum value, and/or relaxation. Evaluating S8 may be based on the fulfilment of one or more integrity criteria defined for the characteristics of the TMP, e.g., for one or more of magnitude, time to reach maximum value, and/or relaxation. The magnitude of the TMP at its maximum value gives an indication of the FO-membrane has an integrity error or not. Also, the time period it takes for the maximum TMP to be reached, after the flows have been stopped, gives an indication whether or not the FO-membrane has an integrity error. While the maximum TMP is building, an integrity error will cause a transport of fluid from the draw side 2a to the feed side 2b and cause the maximum TMP to be reached faster and/or at a lower level than if there was no integrity error. Hence, evaluating the integrity S8 may include determining and comparing the magnitude of the TMP at its maximum value to a predetermined magnitude of a TMP at its maximum value defined for a FO-membrane having integrity (for equivalent fluids). Also, evaluating the integrity S8 may include determining and comparing the time it takes for establishing a maximum TMP with the time it takes for establishing a maximum TMP defined for a FO-membrane having integrity. If the difference is lower than or equal to a respective predetermined threshold, evaluating S8 may include determining that the FO-membrane has sufficient integrity, or else determining that the FO-membrane lacks sufficient integrity. The thresholds may be predetermined by experimentation or via calculations. After the maximum TMP has been reached, the TMP strives to relax, and hence if the FO-filter has an integrity error, then fluid may travel from the draw side 2b, having a higher hydrostatic pressure, to the feed side 2a having a lower hydrostatic pressure. The difference between the hydrostatic pressure on the feed side 2a and the hydrostatic pressure on the draw side 2b will then be decreased. This means that the TMP will decrease, hence, it will undergo relaxation. In other words, in some embodiments, evaluating the integrity S8 comprises evaluating relaxation of the TMP based on the monitored one or more pressures indicative of the TMP. Hence, the method comprises monitoring the one or more pressures for relaxation. As the pressures are not controlled, the relaxation may be referred to as a free or uncontrolled feed side 2a and draw side 2b pressure difference relaxation. The relaxation may be caused by either convective fluid transport from the draw side 2b to the feed side 2a, hence a leak, or diffusive solute transport from the draw side 2b to the feed side 2a (with diffusive water transport from the draw side 2b to the feed side 2a). The TMP relaxation rate and/or characteristics of the TMP may be monitored. The larger the leak and/or diffusive transport, the larger the magnitude of the relaxation rate of the TMP. The relaxation rate is thus the time derivative or gradient of the TMP. The relaxation rate indicates at what pace the TMP is being relaxed, hence, at what pace the hydrostatic pressure on the feed side 2a and the hydrostatic pressure on the draw side 2b are being equalized. Hence, in some embodiments, the method comprises evaluating the integrity S8 of the FO-membrane 2c based on a magnitude of a relaxation rate of the TMP determined based on the monitored one or more pressures indicative of the TMP. Certain integrity criteria may be applied to the magnitude of the relaxation rate to evaluate the integrity of the FO-membrane 2c. The integrity criteria may include one or more predetermined magnitude thresholds. By comparing the magnitude of the relaxation rate with the one or more predetermined magnitude thresholds, the integrity of the FO-membrane may be established. The one or more thresholds are for example predetermined by experimentation or calculations. In some embodiments, a first predetermined magnitude threshold defines a first upper limit for the magnitude of a FO-membrane 2c having integrity, which sets a limit for an acceptable magnitude. If the magnitude is below or on the first upper limit, the evaluation comprises determining that the FO-membrane 2c has integrity. Hence, the relaxation rate is then very slow and indicates normal FO-membrane characteristics (no leak present and anticipated/acceptable rate of solute diffusion). If the magnitude is above the first upper limit, the evaluation comprises determining that the FO-membrane 2c has an integrity error. In some embodiments, a second predetermined magnitude threshold defines a second upper limit for the magnitude of a FO-membrane 2c having integrity. The second upper limit is greater than the first upper limit. If the magnitude is above the first upper limit, but below or on the second limit, the evaluation comprises determining that the FO-membrane 2c has a minor integrity error. The relaxation rate is then in a range from slow to medium and indicates an elevated electrolyte diffusion rate and/or a minor membrane leakage. If the magnitude is above the second upper limit, the evaluation comprises determining that the FO-membrane 2c has a large integrity error. The relaxation rate is then considered high and indicates a membrane leakage that allows significant convective transport of fluid from the draw side 2b to the feed side 2a and/or a highly elevated rate of solute diffusion across the membrane. Hence, the method comprises evaluating the integrity S8 based on a fulfilment of one or more integrity criteria for the magnitude of the relaxation rate of the TMP. The relaxation rate may be determined during a certain time period after the TMP peak, for example, during the first two to five minutes after the TMP peak. In other words, in some embodiments, evaluating the integrity of the FO-membrane comprises evaluating the integrity based on monitored one or more parameters including the one or more pressures indicative of the TMP during a time period after the maximum TMP has been achieved. The result may be communicated to a user via a user interface (not shown) of the control arrangement 10, and/or an alarm may by initiated if an integrity error was detected. The user may then take appropriate action, such as replacing the FO-device if there was an integrity error.

A test was performed using the above-described method with a FO-membrane having integrity (healthy FO-membrane) and with the same FO-membrane with a single fiber ruptured, meaning a leak of the size of two fiber cross-sectional areas. The test was performed two times (N, M) with the same FO-membrane. The FO-membrane used was from Aquaporin™, model HFFO2 (Hollow Fiber Forward Osmosis 2). The result is shown in FIG. 4 in a diagram with TMP (mmHg) along a vertical axis and time (s) along a horizontal axis. The diagram illustrates four TMP-curves, two with an intact FO-membranes and two with a single fiber ruptured. A FO-session was run with a concentrate comprising NaCl, CaCl2, MgCl2 and Na-lactate on the draw side (2.5 ml/min) (corresponding to step S1 in the method) and the same concentrate diluted 1:20 to mimic PD effluent on the feed side (50 ml/min) (corresponding to step S2 in the method). The FO-session was suddenly stopped by stopping the pumps and closing the effluent outlet valve 10e at the time t=0 (corresponding to step S3 of the method). The pressures were measured on the feed side and on the draw side and TMP was calculated as TMP=Pdraw–Pfeed (corresponding to steps S4 and S8 of the method). The resulting TMPs are illustrated in FIG. 4, where M1 and N1 denote TMP peaks for the FO-membrane having integrity and M2 and N2 with one single fiber ruptured. Pdraw was fairly constant since the draw side was open to a fluid collector bag. Pfeed dropped rapidly as water was transported from the feed side to the draw side by means of the remaining osmolarity difference and thereby caused TMP to rise. For the intact FO-membrane tests, TMP rose to around 300 mmHg (M1 and N1) and then dropped slowly during 35 minutes of recording. When a single fiber was manually ruptured, TMP dropped rapidly after the initial rise to around 300 mmHg (M2) and around 280 mmHg (N2) in the two different tests. The results strongly support that small leaks alter the TMP relaxation rate significantly and hence that the method is sensitive enough for an automated integrity evaluation.

In a second embodiment, the method comprises the following additional steps S5-S7, after the step S4. In this embodiment, the second embodiment comprises determining S5 the maximum value of the TMP, based on the monitored one or more pressures indicative of the TMP. The maximum value of the TMP corresponds to the TMP when it has a relaxation rate with a zero magnitude, after the flows have been stopped in step S3. As explained, when the TMP is at its maximum value, the hydrostatic pressure at the feed side 2a is at its minimum value. Hence, the method may include determining the maximum value of the TMP to be the TMP value that has a relaxation rate with a zero magnitude, which occurs at the same time point as when the hydrostatic pressure at the feed side 2a reaches its minimum value. The method further comprises controlling S6 flow of solution via the feed inlet port E$_{in}$ or feed outlet port E$_{out}$ based on the monitored one or more pressures indicative of the TMP and the determined maximum value of TMP, such that the TMP corresponds to the determined maximum value of TMP. In other words, flow is now allowed through either the feed inlet port E$_{in}$ or feed outlet port E$_{out}$, depending, e.g., on which pump is used for control. The method comprises comparing the TMP after the maximum TMP has been achieved, to the determined maximum value of the TMP, and removing any difference between them by controlling the flow rate of the feed solution. Hence, the method comprises controlling the TMP such that is it equal to the determined maximum TMP. Controlling S6 is typically performed by controlling the speed of a pump. In the embodiment in FIG. 2, controlling S6 comprises controlling the speed of the feed pump 3. If there is an integrity issue, it is expected that fluid will be transported from the draw side 2b to the feed side 2b, as previously described, and that the TMP will then decrease. To maintain the TMP at the determined maximum TMP, the method comprises controlling the feed pump 3 to pump fluid out of the feed side 2a via the feed inlet port E$_{in}$ to the effluent container 35. The effluent outlet valve 10e is still closed. Alternatively, another pump (not shown) may be arranged to pump fluid out of the feed side 2a via the feed outlet port E$_{out}$ to drain. The effluent outlet valve 10e is then open, and the feed pump 3 is still stopped. By monitoring a result of the controlling in step S6, such as a parameter being a resulting flow rate, resulting speed of the pump, or resulting power to the pump, an evaluation of the integrity can be made. Hence, the method comprises monitoring S7 one or more parameters indicative of a flow rate of the resulting provided flow of solution. In some embodiments, monitoring S7 comprises monitoring the speed of the feed pump 3. The speed of a pump is already available in the control arrangement 10 as it is a control parameter for each pump. A resulting flow rate may be measured with a flow sensor (not shown) or be provided as a control parameter in the control arrangement 10. The power to a pump, hence the power, current or voltage used by a pump, is also a control parameter that is available to the control arrangement 10.

The method according to the second embodiment further comprises evaluating S8 the integrity of the FO-membrane 2c based on the monitored one or more parameters indicative of a flow rate of the resulting provided flow of solution. Here, the evaluation is based on characteristics of the resulting flow of feed solution, for example, parameters such as the resulting flow rate of the solution from the feed side, the speed of the pump or power used by the pump. Certain integrity criteria may be applied to the monitored one or more parameters to evaluate the integrity of the FO-membrane 2c. Hence, certain integrity criteria may be used to determine integrity of the FO-membrane 2c from the monitored one or more parameters. The integrity criteria may include one or more predetermined parameter thresholds. By comparing a parameter with the one or more predetermined parameter thresholds, the integrity of the FO-membrane may be established. The one or more thresholds are for example predetermined by experimentation or calculations. In some embodiments, a first predetermined magnitude threshold defines a first upper limit for the parameter value of a FO-membrane 2c having integrity. If the parameter value is below or equal to the first upper limit, the evaluation comprises determining that the FO-membrane 2c has integrity. For example, if there is no need to remove fluid from the feed side 2a to control the TMP to the desired TMP, then the FO-membrane 2c has integrity. Here, the resulting flow rate, speed or power is zero, or close to zero. If the parameter value is above the first upper limit, the evaluation comprises determining that the FO-membrane 2c has an integrity error. Hence, if one of the resulting flow rate, speed or power exceeds its first upper limit, respectively, the method comprises determining that the FO-membrane 2c has an integrity error. As understood, a parameter of a certain type is compared with thresholds or limits of the same type. In some embodiments, a second predetermined magnitude threshold defines a second upper limit for the parameter value for a FO-membrane 2c having integrity. The second upper limit is greater than the first upper limit. If the parameter value is above the second upper limit, the evaluation comprises determining that the FO-membrane 2c has a severe integrity error. The one or more parameters may be monitored during a certain time period after the TMP peak, for example, during the first two to five minutes after the TMP peak. Hence, the method comprising evaluating the integrity S8 based on fulfilment of one or more integrity criteria for the one or more parameters indicative of a flow rate of the resulting provided flow of feed solution.

The tested direction of convective (leak) flow in the above described alternatives is from the draw side $2b$ to the feed side $2a$, which is of less interest from a risk perspective than the opposite direction. Still, the evaluation is adequate for solute selectivity and leaks that allows leakage in both directions. However, convective fluid flow from the feed side $2a$ to the draw side $2b$ is of concern since it poses a risk of carrying, e.g., patient effluent into the fluid production side and thereby alter the composition of the produced fluid. Due to the possibility that a leak may act as a backflow valve and only allow leakage in one direction, the above-described alternatives may be complemented with method steps for testing convective flow from the feed side $2a$ to the draw side $2b$. To test for convective fluid flow from feed side $2a$ to draw side $2b$, a bulk pressure difference from the feed side $2a$ to the draw side $2b$ (Pfeed>Pdraw) is established by controlling the feed side pump, e.g., the feed pump 3, while monitoring the feed side pressure with pressure sensor 8, and monitoring the relaxation pressure. Hence, the method comprises temporarily increasing S9 the hydrostatic pressure at the feed side $2a$. The increasing is performed after the tested direction from the draw side $2b$ and the feed side $2a$ has been performed, hence, after arriving at step S8. The temporal increasing entails that the hydrostatic pressure at the feed side $2a$ will increase compared to the hydrostatic pressure at the draw side $2b$. The TMP will then first become zero and then increase in an opposite direction compared to the direction of the TMP at the previously explained maximum TMP. When the feed side pressure has been increased to a certain level, for example 300 mmHg, a step S10 is performed including stopping feed pump 3 (whereby flow via feed inlet port $E_{in}$ is stopped). Flow via draw inlet port $L_{in}$ and flow via the feed outlet port $E_{out}$ are likewise stopped. The same steps S4 and S8, possibly alternatively S4 to S8, are now repeated, hence, the TMP gradient is evaluated or the TMP at a zero magnitude of gradient is maintained by pumping with the feed pump 3, with the only difference being that the evaluation evaluates integrity errors caused by leakage from feed side $2a$ to draw side $2b$. Hence, in some embodiments, the method comprises (i) increasing the hydrostatic pressure at the feed side $2a$ such that it is greater than the hydrostatic pressure at the draw side $2b$ after performing the step S8, (ii) stopping S10 flow via the feed inlet port $E_{in}$ and (ii) repeating the method steps S4 and S8, or S4 to S8.

The disclosure also relates to a control arrangement 10 for evaluating the integrity of a forward osmosis (FO)-membrane $2c$ of a FO-device 2 in a dialysis solution generation apparatus 1. The FO-membrane $2c$ separates a feed side $2a$ and a draw side $2b$ of the FO-device 2. The control arrangement 10 comprises the feed pump 3 being configured to provide a flow of feed solution at the feed side $2a$ via the feed inlet port $E_{in}$, the draw pump 5 being configured to provide a flow of draw solution at the draw side $2b$ via the draw inlet port $L_{in}$ at an osmotic pressure at the draw side $2b$ that is higher than an osmotic pressure at the feed side $2a$, thereby allowing extraction of water from the feed side $2a$ to the draw side $2b$ to dilute the draw solution. The control arrangement 10 also comprises one or more pressure sensors 8 configured to measure one or more pressures indicative of a TMP between the draw side $2b$ and the feed side $2a$, and a valve arrangement 20 configured to control one or more flows via the draw inlet port, feed inlet port or feed outlet port. The control arrangement 10 is configured to stop the flow via the draw inlet port $E_{in}$, flow via the feed inlet port $L_{in}$ and flow via the feed outlet port $E_{out}$ using the feed pump 3, the draw pump 5, and the valve arrangement 10, thereby allowing water to continue to be extracted from the feed side $2a$ to the draw side $2b$, until a transmembrane pressure (TMP) between the draw side $2a$ and the feed side $2b$ has reached a maximum value. The control arrangement 10 is further configured to monitor one or more pressures indicative of the TMP, using the one or more pressure sensors 8; and to evaluate the integrity of the FO-membrane based on monitored one or more parameters including the monitored one or more pressures.

According to some embodiments, the control arrangement 10 is configured to perform the method according to any one of the embodiments described herein.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the scope of the appended claims.

The invention claimed is:

1. A method for evaluating the integrity of a forward osmosis (FO-) membrane of a FO-device in a dialysis solution generation apparatus, the FO-membrane separating a feed side and a draw side of the FO-device, the FO-device comprising a feed inlet port and a feed outlet port in fluid communication with the feed side, and a draw inlet port and a draw outlet port in fluid communication with the draw side, the method comprising:

providing a flow of feed solution at the feed side via the feed inlet port;
   providing a flow of draw solution at the draw side via the draw inlet port, at an osmotic pressure at the draw side that is higher than an osmotic pressure at the feed side, whereby water is extracted from the feed side to the draw side to dilute the draw solution;
   stopping flow via the draw inlet port, flow via the feed inlet port, and flow via the feed outlet port, whereby water continues to be extracted from the feed side to the draw side, until a transmembrane pressure (TMP) between the draw side and the feed side has reached a maximum value;
   monitoring one or more pressures indicative of the TMP; and
   evaluating the integrity of the FO-membrane based on a monitored one or more parameters including the one or more pressures indicative of the TMP.

2. The method according to claim 1, wherein evaluating the integrity comprises:

evaluating characteristics of the TMP or one or more pressures indicative of the TMP, including one or more of magnitude, time to reach maximum value, and/or relaxation.

3. The method according to claim 2, further comprising evaluating the integrity of the FO-membrane based on a magnitude of a relaxation rate based on the monitored one or more pressures indicative of the TMP.

4. The method according to claim 3, further comprising evaluating the integrity based on fulfilment of one or more integrity criteria for the magnitude of the relaxation rate of the TMP.

5. The method according to claim 1, wherein evaluating the integrity of the FO-membrane comprises evaluating the integrity based on a monitored one or more parameters including the one or more pressures indicative of the TMP during a time period after the stopping has been performed.

6. The method according to claim 1, wherein the maximum value of the TMP is characterized by a relaxation rate of the TMP having a zero magnitude.

7. The method according to claim 1, further comprising:

determining the maximum value of the TMP based on the monitored one or more pressures indicative of the TMP;

controlling flow of solution via the feed inlet port or feed outlet port based on the monitored one or more pressures indicative of the TMP and the determined maximum value of TMP, such that the TMP corresponds to the determined maximum value of TMP; and monitoring one or more parameters indicative of a flow rate of the resulting provided flow of solution.

8. The method according to claim 7, wherein the controlling comprises controlling the speed of a feed pump;

the monitoring comprises monitoring the speed of the feed pump; and evaluating the integrity comprises evaluating the integrity of the FO-membrane based on the monitored speed of the feed pump.

9. The method according to claim 7, further comprising evaluating the integrity based on fulfilment of one or more integrity criteria for the one or more parameters indicative of a flow rate of the resulting provided flow of feed solution.

10. The method according to claim 1, wherein the draw outlet port is connected to a diluted concentrate container.

11. The method according to claim 1, wherein the monitoring comprises monitoring one or more pressures including a pressure indicative of the pressure at the feed side, and/or the monitoring comprises monitoring one or more pressures including a pressure indicative of the pressure at the draw side.

12. The method according to claim 1, further comprising:

increasing the hydrostatic pressure at the feed side such that it is greater than the hydrostatic pressure at the draw side;

stopping flow via the feed inlet port;

monitoring one or more pressures indicative of the TMP; and evaluating the integrity of the FO-membrane based on a monitored one or more parameters including the one or more pressures indicative of the TMP.

13. A control arrangement for evaluating the integrity of a forward osmosis (FO-) membrane of a FO-device in a dialysis solution generation apparatus, the FO-membrane separating a feed side and a draw side of the FO-device, the FO-device comprising a feed inlet port and a feed outlet port in fluid communication with the feed side, and a draw inlet port and a draw outlet port in fluid communication with the draw side, the control arrangement comprising:

a feed pump configured to provide a flow of feed solution at the feed side via the feed inlet port;

a draw pump configured to provide a flow of draw solution at the draw side via the draw inlet port, at an osmotic pressure at the draw side that is higher than an osmotic pressure at the feed side, thereby allowing extraction of water from the feed side to the draw side to dilute the draw solution;

one or more pressure sensors configured to measure one or more pressures indicative of a TMP between the draw side and the feed side; and a valve arrangement configured to control one or more flows via at least one of the draw inlet port, feed inlet port or feed outlet port, wherein the control arrangement is configured to:

stop the flow via the draw inlet port, flow via the feed inlet port and flow via the feed outlet port, using the feed pump, the draw pump, and the valve arrangement, thereby allowing water to continue to be extracted from the feed side to the draw side until a transmembrane pressure (TMP) between the draw side and the feed side has reached a maximum value, monitor one or more pressures indicative of the TMP using the one or more pressure sensors, and evaluate integrity of the FO-membrane based on a monitored one or more parameters including the one or more pressures indicative of the TMP.

14. The control arrangement according to claim 13, which is further configured to;

evaluate characteristics of the TMP or one or more pressures indicative of the TMP, including one or more of magnitude, time to reach maximum value, and/or relaxation.

15. A solution generation apparatus for generating dialysis solution, the apparatus comprising a forward osmosis (FO-) device comprising a FO-membrane that separates a feed side and a draw side of the FO device, the apparatus further comprising a control arrangement, the control arrangement comprising:

a feed pump configured to provide a flow of feed solution at the feed side via a feed inlet port;

a draw pump configured to provide a flow of draw solution at the draw side via a draw inlet port, at an osmotic pressure at the draw side that is higher than an osmotic pressure at the feed side, thereby allowing extraction of water from the feed side to the draw side to dilute the draw solution;

one or more pressure sensors configured to measure one or more pressures indicative of a TMP between the draw side and the feed side; and a valve arrangement configured to control one or more flows via at least one of the draw inlet port, feed inlet port or feed outlet port, wherein the control arrangement is configured to:

stop the flow via the draw inlet port, flow via the feed inlet port and flow via the feed outlet port, using the feed pump, the draw pump, and the valve arrangement, thereby allowing water to continue to be extracted from the feed side to the draw side until a transmembrane pressure (TMP) between the draw side and the feed side has reached a maximum value, monitor one or more pressures indicative of the TMP using the one or more pressure sensors, and evaluate integrity of the FO-membrane based on a monitored one or more parameters including the one or more pressures indicative of the TMP.

* * * * *